US010946753B2

(12) United States Patent
Cho

(10) Patent No.: US 10,946,753 B2
(45) Date of Patent: Mar. 16, 2021

(54) WIRED AND WIRELESS CHARGING DEVICE FOR ELECTRIC VEHICLE

(71) Applicant: GREEN POWER CO., LTD., Hwaseong-si (KR)

(72) Inventor: Jung Goo Cho, Suwon-si (KR)

(73) Assignee: GREEN POWER CO., LTD., Hwaseong-si (KR)

( * ) Notice: Subject to any disclaimer, the term of this patent is extended or adjusted under 35 U.S.C. 154(b) by 157 days.

(21) Appl. No.: 16/324,721

(22) PCT Filed: Aug. 11, 2017

(86) PCT No.: PCT/KR2017/008721
§ 371 (c)(1),
(2) Date: Feb. 11, 2019

(87) PCT Pub. No.: WO2018/030830
PCT Pub. Date: Feb. 15, 2018

(65) Prior Publication Data
US 2019/0168631 A1 Jun. 6, 2019

(30) Foreign Application Priority Data
Aug. 12, 2016 (KR) .................. 10-2016-0103159

(51) Int. Cl.
| B60L 53/10 | (2019.01) |
| H02J 50/12 | (2016.01) |
| B60L 53/12 | (2019.01) |
| B60L 53/14 | (2019.01) |
| H02J 7/02 | (2016.01) |

(52) U.S. Cl.
CPC ............... *B60L 53/10* (2019.02); *B60L 53/12* (2019.02); *B60L 53/14* (2019.02); *H02J 7/025* (2013.01); *H02J 50/12* (2016.02); *Y02T 10/70* (2013.01); *Y02T 10/72* (2013.01)

(58) Field of Classification Search
CPC . Y02E 60/12; H02J 7/025; H02J 5/005; H02J 17/00; H01F 38/14; Y02T 90/122; B60L 11/182
USPC ........ 320/108; 307/104, 2, 4, 8, 10.1, 11–87
See application file for complete search history.

(56) References Cited

U.S. PATENT DOCUMENTS

| 2010/0224725 A1 | 9/2010 | Perlman et al. |
| 2011/0254377 A1* | 10/2011 | Wildmer ............... B60L 53/122 307/104 |
| 2011/0302078 A1* | 12/2011 | Failing .................. B60L 53/124 705/39 |

(Continued)

FOREIGN PATENT DOCUMENTS

| EP | 2983267 A1 | 2/2016 |
| EP | 2985875 A1 | 2/2016 |

(Continued)

*Primary Examiner* — Nathaniel R Pelton
*Assistant Examiner* — Mohammed J Sharief
(74) *Attorney, Agent, or Firm* — Li & Cai Intellectual Property (USA) Office

(57) ABSTRACT

The wired and wireless charging device for an electric vehicle according to the present invention does not only dramatically reduce the costs for charging infrastructure but also making a user convenient in terms of time and space, since it is possible to charge electric vehicles of different charging modes with one charging device.

12 Claims, 3 Drawing Sheets

(56) References Cited

U.S. PATENT DOCUMENTS

| | | | | |
|---|---|---|---|---|
| 2012/0049794 A1* | 3/2012 | Han | ................ | B60L 58/20 |
| | | | | 320/109 |
| 2012/0153717 A1* | 6/2012 | Obayashi | ............ | B60L 11/1816 |
| | | | | 307/9.1 |
| 2013/0043833 A1* | 2/2013 | Katz | ................ | H02J 7/007194 |
| | | | | 320/108 |
| 2013/0076155 A1* | 3/2013 | Yu | ................ | H02J 9/061 |
| | | | | 307/104 |
| 2014/0062394 A1* | 3/2014 | Khan | ................ | B60L 11/1812 |
| | | | | 320/108 |
| 2014/0217971 A1* | 8/2014 | Wu | ................ | B60L 3/0069 |
| | | | | 320/109 |
| 2014/0340039 A1* | 11/2014 | Lee | ................ | B60L 53/122 |
| | | | | 320/109 |
| 2015/0331135 A1* | 11/2015 | Widmer | ................ | G01V 3/101 |
| | | | | 324/234 |
| 2016/0001665 A1* | 1/2016 | Kim | ................ | B60L 53/00 |
| | | | | 320/109 |
| 2017/0072807 A1* | 3/2017 | Matsumoto | ............ | B60L 53/20 |

FOREIGN PATENT DOCUMENTS

| | | |
|---|---|---|
| JP | 2015-528269 A | 9/2015 |
| JP | 2016-015876 A | 1/2016 |
| KR | 10-2012-0125604 A | 11/2012 |
| KR | 10-2016-0010471 A | 1/2016 |
| WO | WO 2015-159560 A1 | 10/2015 |
| WO | 2014157095 A1 | 2/2017 |

\* cited by examiner

WIRED AND WIRELESS CHARGING DEVICE FOR ELECTRIC VEHICLE

TECHNICAL FIELD

The present invention relates to a wired and wireless charging device, and more particularly, to a wired and wireless charging device, as a single charging device, for charging a wireless charging type electric vehicle, as well as a plug-in charging type electric vehicle without a wireless charging function. The present invention relates to wired and wireless charging device for an electric vehicle, capable of promoting user convenience in terms of time and space, as well as significantly reducing cost for charging infrastructure, as compared with a case where a wired charging device and a wireless charging device are separately installed.

BACKGROUND ART

Air pollution due to fine dust has recently emerged as a social issue and exhaust gases emitted from automobiles has been pointed out as a major factor thereof.

Thus, many researches and developments have been made on electric vehicles, which do not produce an exhaust gas, as an alternative for improving the environment pollution including fine dust, and electric vehicles, which have been supplied in small quantities, are at the point of being sharply increased in supply as they have been developed to allow long-distance driving.

An electric vehicle includes a battery capable of storing electric energy and a plug-in method has been commonly used as a charging method for charging the battery. According to the plug-in method, a plug is detached from a charging device and put into an inlet of the electric vehicle to perform charging, and when charging is finished, the plug is disconnected from the electric vehicle and mounted on the charging device, thus completing charging. This process is very cumbersome and inconvenient. Plugs are generally heavy and not clean, so it is very difficult for women or elderly people to handle, and the handicapped may not be able to use the plug to charge.

Recently, a wireless charging method, allowing charging without plugging, has been actively developed and researched as an alternative to the plug-in charging method. The wireless charging method has gone through standardization and now is in stages of commercialization.

The wireless charging method is a plug-free method for charging a battery of an electric vehicle using magnetic inductive coupling between a transmitting coil installed on the ground and a receiving coil installed in an electric vehicle.

The wireless charging method automatically senses an electric vehicle when the electric vehicle is parked in a parking lot and automatically performs charging, without any operation, when the electric vehicle requests it, which is, thus, so simple and convenient as compared to the plug-in method. Especially, it is free of a risk of electric shock in the event of rain and very convenient because a driver does not need to touch a cold plug during the winter.

It is anticipated that almost all the charging devices are eventually switched to use a wireless method but the plug-in type electric vehicles and wireless charging type electric vehicles will coexist for the considerable time being until the wireless charging method is completely adopted some time in the future, which causes a problem that charging devices supporting the plug-in charging method and the wireless charging method must be separately installed in each charging station or parking lot.

DISCLOSURE

Technical Problem

An object of the present invention is to provide a wired and wireless charging device for an electric vehicle, capable of identifying whether a charging mode of an electric vehicle is a plug-in type or a wireless charging type and charging the electric vehicle according to the identified charging mode, whereby since electric vehicles having different charging modes can be charged by the single charging device, cost for charging infrastructure may be significantly reduced and user convenience in terms of time and space may be promoted.

Technical subjects obtainable from the present invention are not limited by the above-mentioned technical task and other unmentioned technical tasks can be clearly understood from the following description by those having ordinary skill in the art to which the present invention pertains.

Technical Solution

In one general aspect, a standard wired and wireless charging device for an electric vehicle includes: an AC input circuit breaker connected to a commercial AC power source and controlling power supply; a wireless charging unit including a high-frequency inverter, a primary resonant circuit, and a transmitting coil, and charging a battery through a receiving coil, a secondary resonant circuit, and a rectifying unit provided in the electric vehicle; a standard wired charging unit including a charging plug and charging the battery through an inlet and an on-board charger installed in the electric vehicle; a changeover switch connecting an output from the AC input circuit breaker to the wireless charging unit or the standard wired charging unit; and a controller controlling the standard wired charging unit and the wireless charging unit and controlling the changeover switch, wherein the wireless charging unit or the standard wired charging unit may be selectively driven to charge the electric vehicle wiredly or wirelessly depending on the type of electric vehicle to be charged.

In the standard wired and wireless charging device for an electric vehicle according to an exemplary embodiment of the present invention, the wired charging unit may exchange control signals with the electric vehicle wiredly and the wireless charging unit may exchange control signals with the electric vehicle wirelessly.

In another general aspect, a quick wired and wireless charging device for an electric vehicle includes: a high-frequency inverter; a wireless charging unit including a primary resonant circuit and a transmitting coil and charging a battery through a receiving coil, a secondary resonant circuit, and a rectifying unit provided in the electric vehicle; a quick wired charging unit including a rectifier, a filter, and a charging plug, and charging an inlet mounted in the electric vehicle and a battery connected thereto; a changeover switch connecting an output from the high-frequency inverter to the wireless charging unit or the wired charging unit; and a controller controlling the quick wired charging unit, the wireless charging unit, and the changeover switch, wherein the quick wired charging unit or the wireless charging unit may be selectively driven to charge the electric vehicle wiredly or wirelessly depending on the type of electric vehicle to be charged.

In the quick wired and wireless charging device for an electric vehicle according to another exemplary embodiment of the present invention, the wireless charging unit may further include a transformer inserted in front of the primary resonant circuit.

In the quick wired and wireless charging device for an electric vehicle according to another exemplary embodiment of the present invention, the quick wired charging unit may further include a transformer inserted in front of the rectifier.

The quick wired and wireless charging device for an electric vehicle according to another exemplary embodiment of the present invention may further include a transformer inserted between the high-frequency inverter and the changeover switch.

In the standard or quick wired and wireless charging device for an electric vehicle according to the present invention, the controller may include a first communication unit wirelessly transmitting and receiving a wireless charging control signal as a control signal to and from the electric vehicle, and when a charging mode of the electric vehicle is determined as a wireless mode according to the wireless charging control signal received from the first communication unit, the controller may control the changeover switch to supply power to the wireless charging unit.

In the standard or quick wired and wireless charging device for an electric vehicle according to the present invention, the controller may include a second communication unit wiredly transmitting and receiving a wired charging control signal as a control signal to and from the electric vehicle, and when a charging mode of the electric vehicle is determined as a plug-in mode according to the wired charging control signal received from the second communication unit, the controller may control the changeover switch to supply power to the wired charging unit.

In the standard or quick wired and wireless charging device for an electric vehicle according to the present invention, in a case where a charging mode of the electric vehicle supports both the wired mode and the wireless mode, the controller may control the changeover switch to support an identified charging mode depending on as which of the wireless charging control signal and the wired charging control signal the control signal is identified.

In the standard or quick wired and wireless charging device for an electric vehicle according to the present invention, in a case where both the wireless charging control signal and the wired charging control signal are identified as the control signal, the controller may control the changeover switch to supply power to the wired charging unit.

Advantageous Effects

The wired and wireless charging device for an electric vehicle is capable of identifying whether a charging mode of an electric vehicle is a plug-in type or a wireless charging type and charging the electric vehicle according to the identified charging mode. Therefore, electric vehicles having different charging modes can be charged by the single charging device, and thus, cost for charging infrastructure may be significantly reduced and user convenience in terms of time and space may be promoted.

BEST MODE

Hereinafter, exemplary embodiments of the present invention will be described in detail with reference to the accompanying drawings. The following detailed description is merely exemplary and merely illustrative of the exemplary embodiments of the present invention.

The wired and wireless charging device for an electric vehicle according to the present invention is capable of selectively charging a wired charging type electric vehicle and a wireless charging type electric vehicle. The wired and wireless charging device for an electric vehicle according to the present invention may be applied to any place provided with a charging device for charging an electric vehicle and may not be limited to a location where an electric vehicle may be charged.

Figure 1:
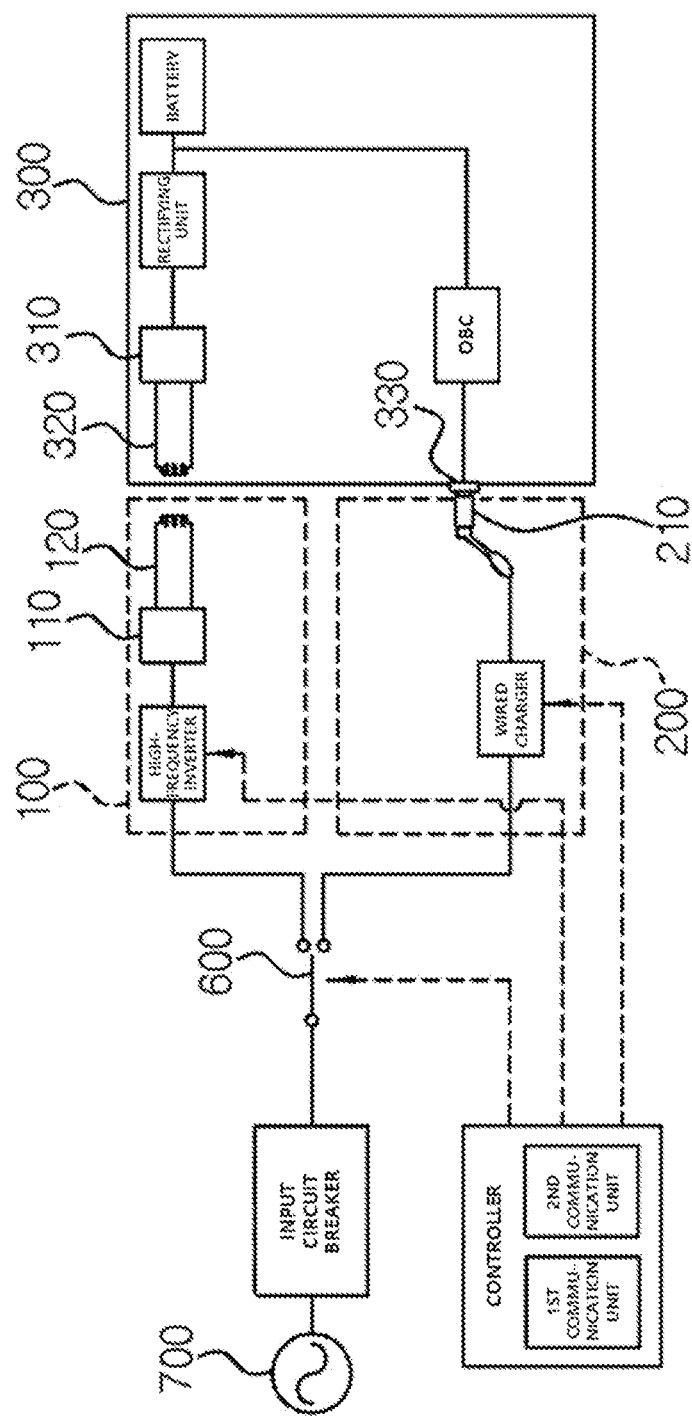
FIG. 1 is a block diagram of a standard wired and wireless charging device for an electric vehicle according to an exemplary embodiment of the present invention.

FIG. 1 is a block diagram of a standard wired and wireless charging device, among wired and wireless charging devices for an electric vehicle, according to an exemplary embodiment of the present invention.

The standard wired and wireless charging device for an electric vehicle according to an exemplary embodiment of the present invention illustrated in FIG. 1 includes a standard wireless charging unit 100 and a standard wired charging unit 200, and a controller identifies whether a charging mode of an electric vehicle 300 in a waiting state for charging is a wired charging mode or a wireless charging mode and controls a changeover switch 600 to supply power to the standard wireless charging unit 100 or the standard wired charging unit 200 according to the identified charging mode of the electric vehicle 300.

Referring to FIG. 1, the standard wired and wireless charging device for an electric vehicle according to an exemplary embodiment of the present invention includes a standard wireless charging unit 100 including a high-frequency inverter, a primary resonant circuit 110, and a transmitting coil 120 and charging a battery through a receiving coil 320, a secondary resonant circuit 310, and a rectifying unit provided in an electric vehicle 300, a standard wired charging unit 200 including a charging plug 210 and put into a charging inlet 330 mounted in the electric vehicle 300 to perform charging, a changeover switch 600 connecting a commercial AC power 700 to the wireless charging unit or the wired charging unit, and a controller controlling the high-frequency inverter and the changeover switch 600, and performs wired or wireless charging by selectively driving the standard wireless charging unit 100 or the standard wired charging unit 200 depending on the type of electric vehicle 300 to be charged. Here, the standard wired and wireless charging device for an electric vehicle according to an exemplary embodiment of the present invention may further include an AC input circuit breaker, which controls power supply in an abnormal state such as overcurrent, a short-circuit, or the like, between the commercial AC power 700 and the changeover switch 600.

The high-frequency inverter serves to apply a high-frequency AC current to the transmitting coil 120 of the standard wireless charging unit 100 so that the electric vehicle 300 may be charged with power induced to the receiving coil 320.

The primary resonant circuit 110 is a component provided between the high-frequency inverter and the transmitting coil 120. The primary resonant circuit 110 serves to match resonant frequencies between the transmitting coil 120 and the receiving coil 320 to maximize efficiency of power transmission. Similarly, the secondary resonant circuit 310 provided in the electric vehicle 300 also serves to match resonant frequencies between the receiving coil 320 of the electric vehicle 300 and the transmitting coil 120 to improve efficiency of power transmission.

The transmitting coil 120 and the receiving coil 320, when provided in the standard wireless charging unit 100 and the electric vehicle 300, respectively, are magnetically coupled to transmit charging power, and may transmit or receive a control signal for identifying a charging mode of the electric vehicle 300 or controlling a charging state of the electric vehicle 300 as necessary.

Therefore, when the charging mode of the electric vehicle 300 is identified as the wireless charging mode and power is supplied to the standard wireless charging unit 100 by the changeover switch 600, the high-frequency inverter of the standard wireless charging unit 100 produces AC type charging power and transmits the charging power to the electric vehicle 300 through magnetic inductive coupling between the transmitting coil 120 and the receiving coil 320. Here, the electric vehicle 300 may include a rectifier rectifying the charging power received by the receiving coil 320 and a DC/DC converter or a regulator converting the rectified power into an appropriate voltage or current to charge a battery.

Although not shown, the controller may include a first communication unit wirelessly transmitting and receiving a wireless charging control signal as a control signal to and from the electric vehicle 300. Here, when it is determined that the charging mode of the electric vehicle 300 is the wireless charging mode according to the wireless charging control signal received from the first communication unit, the controller controls the changeover switch 600 to supply power to the standard wireless charging unit 100.

The first communication unit may use at least one of Wi-Fi, Bluetooth, ZigBee, and Z-Wave as a communication method and may transmit and receive a wireless charging control signal via magnetic induction using the transmitting coil 120 and the receiving coil 320. Also, in the case of transmitting and receiving the wireless charging control signal via magnetic induction, the first communication unit may transmit and receive the wireless charging control signal using a separate communication coil, instead of using the transmitting coil 120 and the receiving coil 320.

The standard wired charging unit 200, which is a component for supplying charging power to the electric vehicle 300 wiredly, includes a charging plug 210. When the charging plug 210 is put into the charging inlet 330 mounted in the vehicle 300, the battery may be charged through an on-board charger connected to the charging inlet 330.

Although not shown, the controller may include a second communication unit transmitting and receiving a wired charging control signal, as a control signal, to and from the electric vehicle 300 wiredly. Here, in a case where a charging mode of the electric vehicle 300 is determined as the wired charging mode according to the wired charging control signal received from the second communication unit, the controller controls the changeover switch 600 to supply power to the standard wired charging unit 200.

Here, in order for the standard wired charging unit 200 and the electric vehicle 300 to transmit and receive the wired charging control signal wiredly, the charging plug 210 of the standard wired charging unit 200 may further include a control terminal for transmitting and receiving the wired charging control signal in addition to a power feeding terminal for transmitting charging power.

The controller is a component for controlling operations of the standard wireless charging unit 100, the standard wired charging unit 200, and the changeover switch 600 according to the charging modes of the electric vehicle 300.

When the electric vehicle 300 enters a charging area for charging, the controller may determine whether the electric vehicle 300 is in the wireless charging mode using the first communication unit described above, and when the charging plug 210 is engaged with the charging inlet 330 of the electric vehicle 300 by the user, the controller may recognize a charging mode of the electric vehicle 300 as the wired charging mode using the second communication unit. Therefore, the controller may apply power to the corresponding standard wireless charging unit 100 or the standard wired charging unit 200 by controlling the changeover switch 600 according to the identified charging mode to operate the same to thus charge the electric vehicle 300.

Although the electric vehicle 300 has both the wireless charging mode and the wired charging mode, the electric vehicle 300 may be charged by an appropriate charging mode depending on user selection. Although the electric vehicle 300 enters the charging area and is identified as in the wireless charging mode, the user may engage the charging plug 210 to the charging inlet 330 of the electric vehicle 300 to charge the electric vehicle 300 in a wired manner, taking precedence over the wireless method.

Figure 2:
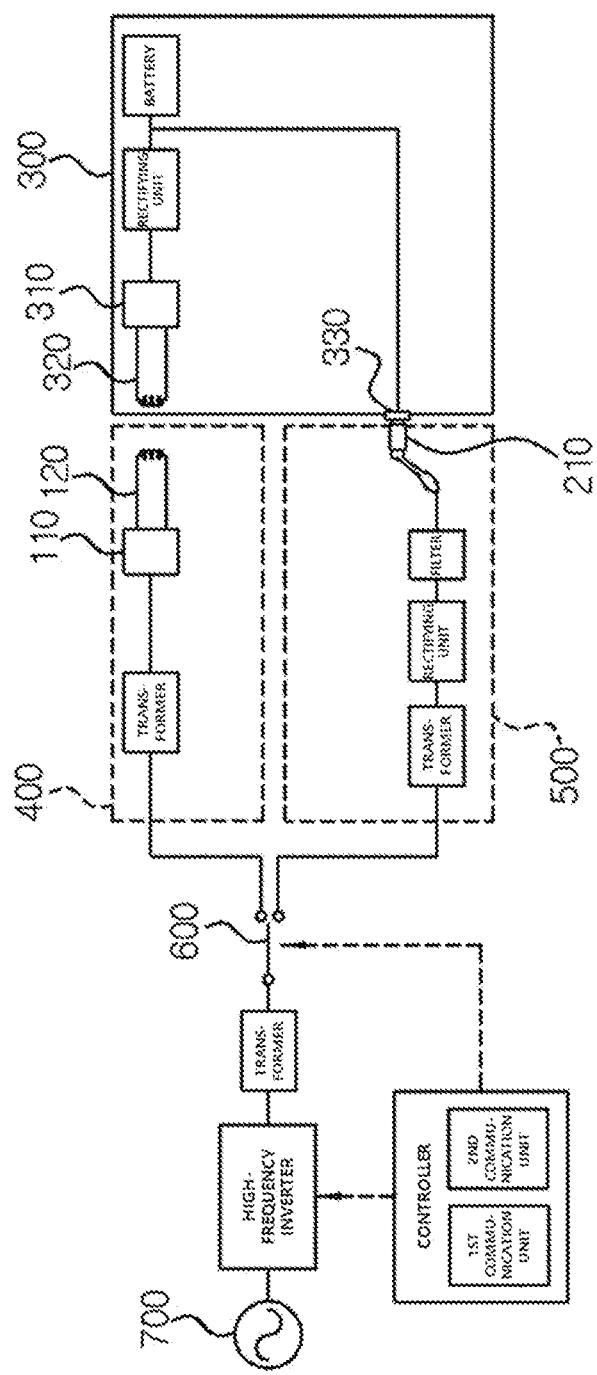
FIG. 2 is a block diagram of a quick wired and wireless charging device for an electric vehicle according to another exemplary embodiment of the present invention.

FIG. 2 is a block diagram of a quick wired and wireless charging device, among the wired and wireless charging devices for an electric vehicle, according to another exemplary embodiment of the present invention.

The quick wired and wireless charging device for an electric vehicle according to another exemplary embodiment of the present invention is different from the previous exemplary embodiment described above, in that a quick wireless charging unit 400 and a quick wired charging unit 500 share a high-frequency inverter.

Although not shown, the quick wired and wireless charging device for an electric vehicle according to another exemplary embodiment of the present invention may further include a transformer for the purposes of matching and insulation. For example, the transformer may be inserted in front of the primary resonant circuit 110 of the quick wireless charging unit 400, inserted in front of the rectifying unit of the quick wired charging unit 500, or inserted between the high-frequency inverter and the changeover switch 600.

As described above, the quick wired and wireless charging device for an electric vehicle according to another exemplary embodiment of the present invention illustrated in FIG. 2 is different from the charging device of the previous exemplary embodiment in that the quick wireless charging unit 400 and the quick wired charging unit 500 share the high-frequency inverter. The quick wireless charging unit 400 has the same function as that of the standard wireless charging unit 100, but the quick wired charging unit 500 generates and transfers a DC output to a plug, and when the plug is put into the inlet installed in the electric vehicle 300, the battery may be immediately connected to perform charging, without an on-board charger. The other operations are the same as those of the standard wired and wireless charging device, and thus, a detailed description thereof will be omitted.

Figure 3:
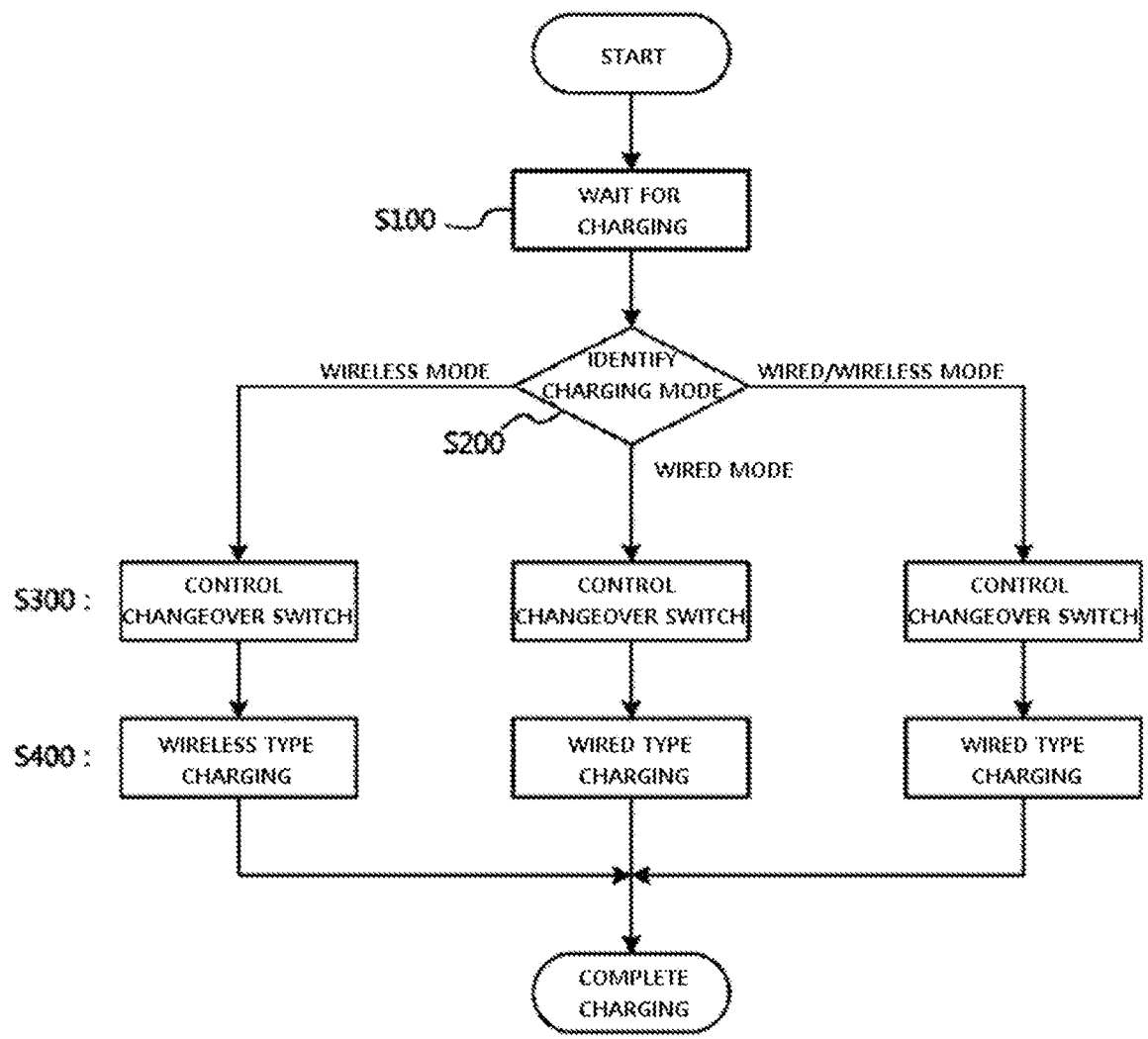
FIG. 3 is an operational flowchart of a wired and wireless charging device for an electric vehicle according to the present invention.

FIG. 3 illustrates an operation flowchart regarding a wired and wireless charging device for an electric vehicle according to one exemplary embodiment and another exemplary embodiment of the present invention.

Referring to FIG. 3, a wired and wireless charging method for an electric vehicle according to the present invention includes a charging waiting operation S100, charging mode identifying operation S200, a changeover switch controlling operation S300, and charging operation S400.

The charging waiting operation S100 starts when the electric vehicle 300 enters a charging-available area, and when the electric vehicle 300 is in the wireless charging mode, the wired and wireless charging device for an electric vehicle may communicate with the first communication unit of the wireless charging unit 100 or 400. Here, as described above, at least one of a Wi-Fi, a Bluetooth, a ZigBee, and a Z-Wave may be used as the communication method, and a wireless charging control signal may be exchanged via magnetic induction using the transmitting coil 120 of the wireless charging unit 100 or 400 and the receiving coil 320 of the electric vehicle 300. Also, in the case of transmitting and receiving the wireless charging control signal via magnetic induction, the first communication unit may also transmit and receive the wireless charging control signal using a separate communication coil, instead of using the transmitting coil 120 or the receiving coil 320.

In the charging mode identifying operation S200, the wired and wireless charging device identifies a charging mode of the electric vehicle 300. The electric vehicle 300 may be determined to be in a wireless mode, a wired mode, or a wireless and wired mode as a result of the determination. In a case where the electric vehicle 300 is in the wireless charging mode, the electric vehicle 300 is identified as being in the wireless charging mode through communication between the first communication unit and the electric vehicle 300, and in a case where the first communication unit and the electric vehicle 300 do not communicate with each other and the user engages the charging plug 210 into the charging inlet 330 of the electric vehicle 300 so the second communication unit performs communication with the electric vehicle 300 wiredly, the electric vehicle 300 is identified as being in the wired charging mode.

In addition, although the electric vehicle 300 is identified as being in the wireless charging mode on the basis of communication between the first communication unit and the electric vehicle 300, if the user puts the charging plug 210 into the charging inlet 330 of the electric vehicle 300, the electric vehicle 300 is identified as a vehicle that supports both wired and wireless charging modes.

In the changeover switch controlling operation S300, power is supplied to the wireless charging unit 100 or 400 or the wired charging unit 200 or 500 according to an identified charging mode. When the electric vehicle 300 is identified as being in a wireless charging mode, the changeover switch 600 is switched to supply power to the wireless charging unit 100 or 400, and when the electric vehicle 300 is identified as being in the plug-in mode, the changeover switch 600 is switched to supply power to the wired charging unit 200 or 500. A case where the electric vehicle 300 is identified as being in the wired and wireless mode corresponds to a case where the user engages the charging plug 210 into the charging inlet 330 of the electric vehicle 300 in a state in which the electric vehicle 300 is identified as being in the wireless charging mode. In this case, the changeover switch 600 is switched to the wired charging unit 200 or 500 so that the electric vehicle 300 may be charged in a wired manner, taking precedence over the wireless method. Here, even in this case, the electric vehicle 300 may be charged in the wireless manner depending on user selection or the changeover switch 600 may be controlled to charge the electric vehicle 300 using both the wired and wireless methods.

In the charging operation S400, the wireless charging unit 100 or 400 or the wired charging unit 200 or 500 operate to charge the electric vehicle 300 according to the identified charging mode. When the electric vehicle 300 is identified as being in the wireless mode, the wireless charging unit 100 or 400 operates to charge the electric device 300 in a wireless manner, and when the electric vehicle 300 is identified as being in the wired mode, the wired charging unit 200 or 500 operates to charge the electric vehicle 300 in the wired manner. When the electric vehicle 300 is identified as being in the two types of charging modes supporting both wired and wireless modes, the electric vehicle 300 may be charged by selecting one of the wired and wireless methods or may be charged using both the wired and wireless methods as necessary.

In addition, in the charging operation (S400), charging information may be exchanged between the charging device and the electric vehicle 300 using a wireless charging control signal and/or a wired charging control signal. For example, when the electric vehicle 300 is being charged in the wireless charging mode, the first communication unit and the electric vehicle 300 may exchange the wireless charging control signals and the charging device of the present invention recognizes a charging state of the electric vehicle 300 and control the wireless charging unit 100 or 400 or the high-frequency inverter accordingly. Similarly, when the electric vehicle 300 is being charged in the wired charging mode, the second communication unit and the electric vehicle 300 may exchange the wired charging control signals and the charging device of the present invention recognizes a charging state of the electric vehicle 300 and control the wired charging unit 200 or 500 or the high-frequency inverter accordingly.

Hereinabove, the wired and wireless charging device for an electric vehicle according to one exemplary embodiment of the present invention or another exemplary embodiment has been described. As described above, the wired and wireless charging device for an electric vehicle according to the present invention, as a single charging device, may charge the electric vehicle 300 having different charging modes, and thus, cost for the charging device may be reduced and user convenience in terms of time or space may be promoted.

While the present invention has been described and illustrated based on preferred embodiments for illustrating the principles of the present invention, the present invention is not limited to the structures and operations as shown and described as such. It will be understood by those skilled in the art that the present invention may be embodied in other specific forms without departing from the spirit or essential characteristics thereof. It is therefore to be understood that the above-described embodiments are illustrative in all aspects and not restrictive. The scope of the present invention is defined by the appended claims, and all changes or modifications derived from the meaning and scope of the claims and their equivalents should be construed as being included within the scope of the present invention.

The invention claimed is:

1. A wired and wireless charging device for an electric vehicle, the wired and wireless charging device comprising:
   a wireless charging unit including a high-frequency inverter, a primary resonant circuit, and a transmitting coil and charging the electric vehicle having a wireless charging function in a wireless manner;
a wired charging unit including a charging plug and put into an inlet mounted in the electric vehicle to perform charging; and
a changeover switch connecting a commercial AC power source to the wireless charging unit or the wired charging unit; and
a controller controlling the wired charging unit, the wireless charging unit, and the changeover switch,
wherein the controller controls the changeover switch to supply power only to the wireless charging unit when the electric vehicle is charged in the wireless manner and controls the changeover switch to supply power only to the wired charging unit when the electric vehicle is charged in a wired manner.

2. The wired and wireless charging device of claim 1, wherein the wireless charging unit exchanges control signals with the electric vehicle wirelessly.

3. The wired and wireless charging device of claim 1, wherein the wired charging unit exchanges control signals with the electric vehicle wiredly.

4. The wired and wireless charging device of claim 1, wherein the controller includes a first communication unit wirelessly transmitting and receiving a wireless charging control signal as a control signal to and from the electric vehicle, and when a charging mode of the electric vehicle is determined as a wireless mode according to the wireless charging control signal received from the first communication unit, the controller controls the changeover switch to supply power to the wireless charging unit.

5. A wired and wireless charging device for an electric vehicle, the wired and wireless charging device comprising:
a high-frequency inverter;
a wireless charging unit including a primary resonant circuit and a transmitting coil and charging the electric vehicle having a wireless charging function in a wireless manner;
a wired charging unit including a rectifier, a filter, and a charging plug, and put into an inlet mounted in the electric vehicle to perform charging;
a changeover switch connecting an output from the high-frequency inverter to the wireless charging unit or the wired charging unit; and
a controller controlling the high-frequency inverter and the changeover switch,
wherein the controller controls the changeover switch to supply power only to the wireless charging unit when the electric vehicle is charged in the wireless manner and controls the changeover switch to supply power only to the wired charging unit when the electric vehicle is charged in a wired manner.

6. The wired and wireless charging device of claim 5 wherein the wireless charging unit further includes a transformer inserted in front of the primary resonant circuit.

7. The wired and wireless charging device of claim 5, wherein the wired charging unit further includes a transformer inserted in front of the rectifier.

8. The wired and wireless charging device of claim 5, further comprising:
a transformer inserted between the high-frequency inverter and the changeover switch.

9. The wired and wireless charging device of claim 5, wherein the controller includes a first communication unit wirelessly transmitting and receiving a wireless charging control signal as a control signal to and from the electric vehicle, and when a charging mode of the electric vehicle is determined as a wireless mode according to the wireless charging control signal received from the first communication unit, the controller controls the changeover switch to supply power to the wireless charging unit.

10. The wired and wireless charging device of claim 9, wherein the controller includes a second communication unit wiredly transmitting and receiving a wired charging control signal as a control signal to and from the electric vehicle, and when a charging mode of the electric vehicle is determined as a plug-in mode according to the wired charging control signal received from the second communication unit, the controller controls the changeover switch to supply power to the wired charging unit.

11. The wired and wireless charging device of claim 10, wherein in a case where a charging mode of the electric vehicle supports both the wired mode and the wireless mode, the controller controls the changeover switch to support an identified charging mode depending on as which of the wireless charging control signal and the wired charging control signal the control signal is identified.

12. The wired and wireless charging device of claim 11, wherein in a case where both the wireless charging control signal and the wired charging control signal are identified as the control signal, the controller controls the changeover switch to supply power to the wired charging unit.

* * * * *